United States Patent [19]

Sayles

[11] Patent Number: 5,032,446
[45] Date of Patent: Jul. 16, 1991

[54] FIRE PROTECTIVE BLANKET

[75] Inventor: David C. Sayles, Huntsville, Ala.

[73] Assignee: United States of America as represented by the Secretary of the Army, Washington, D.C.

[21] Appl. No.: 377,349

[22] Filed: Jul. 10, 1989

[51] Int. Cl.⁵ .............................................. B32B 3/00
[52] U.S. Cl. .................................. 428/161; 428/163; 428/421; 428/477.7; 428/688; 428/921; 428/500; 428/516; 428/474.7
[58] Field of Search ............... 428/161, 156, 921, 421, 428/500, 516, 474.7

[56] References Cited

U.S. PATENT DOCUMENTS

| | | | |
|---|---|---|---|
| 3,905,849 | 9/1975 | Bomboire | 428/161 |
| 4,297,402 | 10/1981 | Kinbara et al. | 428/161 |
| 4,803,112 | 2/1989 | Kakimoto et al. | 428/161 |
| 4,849,273 | 7/1989 | Skinner et al. | 428/921 |
| 4,888,233 | 12/1989 | Brew | 428/921 |

*Primary Examiner*—Edith Buffalow
*Attorney, Agent, or Firm*—Freddie M. Bush

[57] ABSTRACT

A fire protective blanket is fabricated by sealing and forming between two sheets of plastic material a pocket or quilt design of fire extinguishing chemical in powder form which is contained in the formed pockets and selected from potassium hydrogen carbonate, sodium hydrogen carbonate, and the reaction product of potassium hydrogen carbonate and urea. A thickness from about 2 millimeters to about 5 millimeters has been found adequate for the plastic sheet material selected from poly-p-ethylene terephthalamide (Kevlar) or polyethylene. The sealed pocket or patch quilt design is to ensure against the powder from becoming nonuniformly distributed throughout the blanket and to ensure that no settling of the chemical takes place as well. The action mechanism, which can extinguish gasoline fires in millisecond time frames, is due to the rupture of the pockets containing the fire extinguishing chemicals when the gasoline is ignited. The fire extinguishing powder becomes dispersed throughout the immediate environment, and interacts with the fireball, and quenches it. The fire protective blanket is useful in quickly extinguishing automobile engine fires, lawnmower fires, and other fires resulting from burning materials including other liquids, solid, or combinations thereof. When used under an automobile hood in combination with the sound and heat barrier, the fire protective blanket should be installed as the outer layer toward the motor. The plastic material should be fabricated from a higher temperature withstanding material such as FTE (polytertrafluoroethylene) or a copolymer of tetrafluoroethylene and hexafluoropropylene (FEP) or more broadly identified as fluorinated ethylenepropylene resin.

12 Claims, 1 Drawing Sheet

FIRE PROTECTIVE BLANKET

DEDICATORY CLAUSE

The invention described herein may be manufactured, used, and licensed by or for the Government for governmental purposes without the payment to me of any royalties thereon.

BACKGROUND OF THE INVENTION

Extinguishing aids to assist firefighting efforts have included wetting agents to provide wider distribution of water at the base of a fire, dry chemicals in fire extinguishers to produce gaseous products to aid in extinguishment of fire, and standard fire extinguishers containing compressed $CO_2$, dry chemical, or liquefied gas for oil, grease, and electrical fires. The exclusion of oxygen from the fire and the cooling of the fuel source are mechanisms employed in extinguishing fires. Foaming chemicals to blanket a fire such as encountered in fuel fires related to aircraft and land vehicles have been extensively used in fire extinguishing procedures.

It is desirable to provide a fire protective blanket for use in extinguishing burning materials, highly flammable, liquid spills, such as, gasoline which burn with a fireball, or for use in extinguishing other burning materials including other liquids, solids or combinations thereof. Time is of essence in extinguishing these types of fires and preventing reignition; thus, a fire protective blanket is highly desirable.

SUMMARY OF THE INVENTION

A highly efficient fire protective blanket, which is intended to be used in extinguishing burning, highly flammable, liquid spills, such as gasoline, is fabricated in the following manner:

Potassium hydrogen carbonate, or sodium hydrogen carbonate or Monnex (a product formed from the reaction of potassium hydrogen carbonate and urea) in powder form is encapsulated between two sheets of plastic material, such as, Kevlar, or polyethylene, and sealed in a patch quilt design. The pocket design is necessary to ensure against the powder from becoming non-uniformly distributed throughout the blanket and to ensure that no excessive accumulation at a localized site in the sealed pocket takes place as well. A plastic sheet material thickness of 2 mm-5 mm has been found adequate for such a fire extinguishing blanket. The action of this blanket as a fire extinguishing mechanism is due to the rupture of the pockets when the gasoline burns. The fire extinguishing powder becomes dispersed throughout the immediate environment, and interacts with the fireball, and quenches it. There is little likelihood of reignition of the quenched gasoline unless there is a continuously-burning ignition source. Even a large gasoline spill cannot result in a major fire if it can be covered with the fire extinguishing blanket.

DESCRIPTION OF THE PREFERRED EMBODIMENT

The fire protective blanket, which is intended to be used in extinguishing burning, highly flammable, liquid spills, such as gasoline, is comprised of a fire extinguishing chemical in finely divided powder form (e.g. less than 1000 microns) selected from potassium hydrogen carbonate, sodium hydrogen carbonate, and a reaction product of potassium hydrogen carbonate and urea sealed in a pocket or patch quilt design between two sheets of plastic material selected from poly-p-ethylene terephthalamide (Kevlar) or polyethylene. A plastic material thickness from about 2 millimeters (mm) to about 5 millimeters (mm) is adequate for containing the fire extinguishing chemicals in sealed pockets or patch quilt design to ensure against the powder from becoming non-uniformly distributed throughout the blanket and to ensure that no excessive accumulation at a localized site in the sealed pocket takes place as well.

The action of the fire protective blanket can extinguish gasoline fires in millisecond time frames. This action as a fire extinguishing mechanism is due to the rupture of the pockets containing the fire extinguishing chemicals when the gasoline is ignited. The fire extinguishing powder becomes dispersed throughout the immediate environment, and interacts with the fireball, and quenches it. There is little likelihood of reignition of the quenched gasoline unless there is a continuously-burning ignition source. Even a large gasoline spill cannot result in a major fire if it can be covered with the fire extinguishing blanket.

Figure 1:
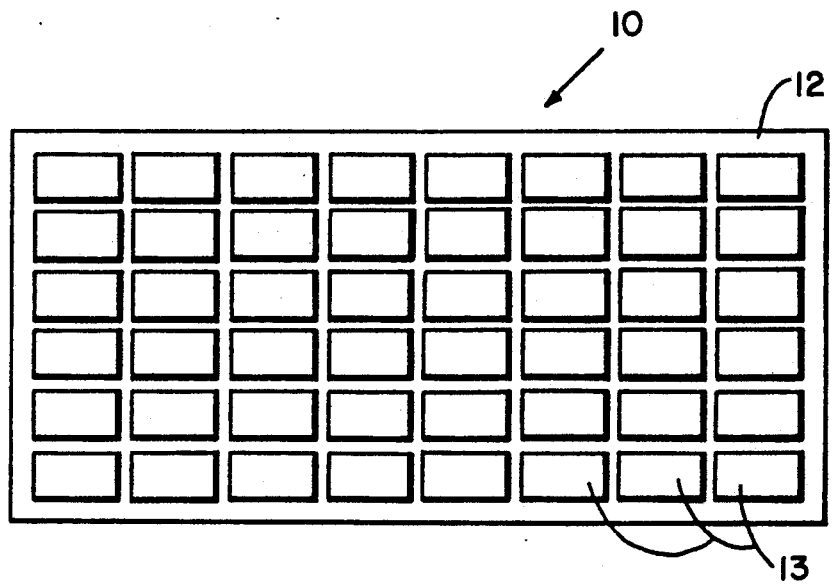
FIG. 1 depicts a patch quilt design of two sheets of plastic material containing fire extinguishing chemicals sealed in pockets formed between the sheets.
Figure 2:
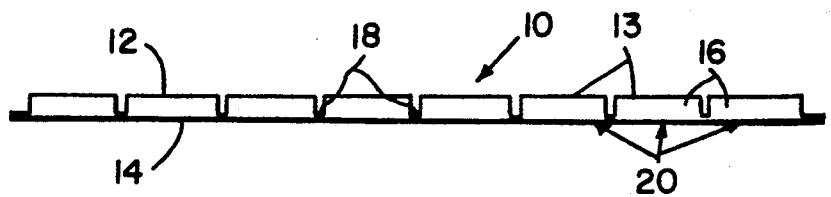
FIG. 2 depicts a view along line 2—2 of FIG. 1, enlarged for clarity, to further illustrate the pockets containing the fire extinguishing chemicals.

In further reference to FIGS. 1 and 2 of the drawing, the fire protective blanket 10 is fabricated after providing a first sheet of a plastic material 12, as identified hereinabove, that has been processed to a thickness from about 2 millimeters to about 5 millimeters and that has been further processed to provide a plurality of predetermined geometrically shaped indentations 13 for receiving a predetermined quantity of a fire extinguishing chemical identified hereinabove. A second sheet of a plastic material, identified hereinabove, and processed as identified hereinabove, (with assigned numeral 14 but not shown in FIG. 1), is employed to contain a fire extinguishing chemical 16 (shown in FIG. 2) in pockets or a patch quilt design. The second sheet of plastic material 14, shown in FIG. 2, mated and sealed at 18 with the first sheet of plastic material 12 illustrates the fire protective blanket 10 having a plurality of pockets 20 in a pocket or patch quilt design containing fire extinguishing chemical 16. The test of effectivity of this fire extinguishing mechanism of the fire protective blanket, including the igniter used to ignite the gasoline, is described hereinbelow.

EXAMPLE

Igniter

A quart glass bottle is filled with gasoline (800 ml) to within 1-2 inches of the top. Concentrated sulfuric acid (200 ml) is added, and the bottle is capped. Potassium chlorate (100 g) mixed with sucrose (100 g) is dissolved in boiling water (250 g), and allowed to cool. Several sheets of absorbent paper are saturated with the potassium chloratesucrose solution, and wrapped around the bottle, and allowed to dry.

When the bottle is broken, the sulfuric acid reacts with the potassium chlorate, igniting the gasoline.

Breaking the glass bottle is accomplished by impacting it with a Cal 0.22 rifle bullet.

A video recorder, operating at 30 frames per second, is used to record the burning tests. Analyses of these data are the bases for determining the burning times durations.

The effectivity of this fire extinguishing approach was determined by comparing potassium hydrogen carbonate, sodium hydrogen carbonate and Monnex as extinguishing powders. These are compared to a baseline test in which the blanket contained no extinguishing powder. Table 1 presents results of these experiments in milliseconds (ms).

TABLE 1
RESULTS OF FIRE EXTINGUISHING BLANKET IN QUENCHING GASOLINE FIRES

| Quantity | Fire Extnguishing Powder/Thickness of Sheet in Millimeter | Duration of Gasoline Fire (ms) |
| --- | --- | --- |
| 1 Liter | None | 400 |
| 1 Liter | Potassium Hydrogen Carbonate/3 | 150 |
| 1 Liter | Sodium Hydrogen Carbonate/3 | 175 |
| 1 Liter | Monnex/3 | 150 |

All of the powders of Table 1 which were investigated were found to be effective quench agents. They were effective in reducing the burn times by at least one-half.

The fire retardant blanket has proven to be highly effective. The greater the number of pockets of the fire retardant blanket that are broken open, the larger is the amount of powder that is ejected, and the greater the effectiveness in snuffing the fire.

The potential uses of the fire retardant blanket are: (a) protecting trucks or military vehicles which transport flammable liquids of all types from hostile or terrorist rifle or rocket fire, (b) quickly extinguishing automobile engine fires, lawnmower fires, etc., and (c) offers protection against other burning materials including other liquids, solids or combinations thereof which would tend to develop rapidly to a fireball or a rapidly spreading fire.

Another potential use of the fire retardant blanket is in combination with the sound and heat barrier normally installed under automobile hoods. In this combination and location, the plastic material should be a higher temperature withstanding material such as FEP (fluorinated ethylenepropylene resin). When installed as the outer layer of the sound and heat barrier (toward the motor), a sudden fire under the hood is extinguished upon rupturing the pockets of chemicals. Another choice of the material is TFE (polytetrafluoroethylene or Teflon). A copolymer of terafluoroethylene and hexafluoropropylene is a more specific term for FEP.

I claim:

1. A fire protective blanket for use in extinguishing burning, highly flammable materials, said highly efficient fire protective blanket comprising:
   (i) a first sheet of plastic material having geometrically shaped indentations therein for receiving an amount of a fire extinguishing chemical;
   (ii) a fire extinguishing chemical in an amount added to said first sheet to substantially fill said geometrically shaped indentations, said fire extinguishing chemical selected from potassium hydrogen carbonate, sodium hydrogen carbonate, and a reaction product of potassium hydrogen carbonate and urea; and
   (iii) a second sheet of plastic material as defined hereinabove for said first sheet of plastic material, said second sheet of plastic material mated and sealed with said first sheet of plastic material to thereby form a highly efficient fire protective blanket having a plurality of sealed pockets in a patch quilt design to ensure against said fire extinguishing chemical from becoming non-uniformly distributed throughout said blanket, said fire protective blanket functioning when exposed to burning, highly flammable materials to disperse said predetermined effective amount of said fire extinguishing chemical throughout the immediate environment which interacts with said fireball of said burning, highly flammable liquid to quench it.

2. The fire protective blanket as defined in claim 1 wherein said fire extinguishing chemical is in the form of a finely divided powder.

3. The fire protective blanket as defined in claim 2 wherein said fire extinguishing chemical is the reaction product of potassium hydrogen carbonate and urea.

4. The fire protective blanket as defined in claim 2 wherein said fire extinguishing chemical is potassium hydrogen carbonate.

5. The fire protective blanket as defined in claim 2 wherein said fire extinguishing chemical is sodium hydrogen carbonate.

6. The fire protective blanket as defined in claim 1 wherein said first sheet of plastic material is selected from poly-p-ethylene terephthalamide, polyethylene, polytetrafluoroethylene, and a copolymer of tetrafluoroethylene and hexafluoropropylene.

7. The fire protective blanket as defined in claim 6 wherein said first sheet of plastic material is processed to a thickness from about 2 millimeters to about 5 millimeters.

8. A fire protective blanket for use in extinguishing burning, highly flammable materials, liquids spills, such as, gasoline which burns with a fireball, or for use in extinguishing other highly flammable burning materials including other liquids, solids or combination thereof, said fire protective blanket comprising:
   (i) a first sheet of plastic material selected from poly-p-ethylene terephthalamide, polyethylene, polytetrafluoroethylene, and copolymer of tetrafluroethylene and hexafluropropylene that has been processed to a thickness from about 2 millimeters to about 5 millimeters and that has been further processed to provide a plurality of geometrically shaped indentations therein for receiving an amount of a fire extinguishing chemical;
   (ii) a fire extinguishing chemical in an amount added to said first sheet to substantially fill said plurality of predetermined geometrically shaped indentations, said fire extinguishing chemical selected from potassium hydrogen carbonate, sodium hydrogen carbonate, and a reaction product of potassium hydrogen carbonate and urea; and
   (iii) a second sheet of plastic material as defined hereinabove for said first sheet of plastic material, said second sheet of plastic material mated and sealed with said first sheet of plastic material to thereby form a highly efficient fire protective blanket having a plurality of sealed pockets in a patch quilt design to ensure against said fire extinguishing chemical from becoming non-uniformly distributed throughout said blanket, said fire protective blanket functioning when exposed to burning, highly flammable materials to disperse said predetermined effective amount of said fire extinguishing chemical throughout the immediate environment which interacts with said fireball of said burning, highly flammable material to quench it.

9. The fire protective blanket as defined in claim 8 wherein said fire extinguishing chemical is in the form of a finely divided powder and wherein said fire protective blanket is highly efficient for extinguishing a highly flammable liquid material.

10. The highly efficient fire protective blanket as defined in claim 9 wherein said fire extinguishing chemical is the reaction product of potassium hydrogen carbonate and urea and wherein said highly flammable liquid material is gasoline.

11. The highly efficient fire protective blanket as defined in claim 9 wherein said fire extinguishing chemical is potassium hydrogen carbonate and wherein said highly flammable liquid material is gasoline.

12. The highly efficient fire protective blanket as defined in claim 9 wherein said fire extinguishing chemical is sodium hydrogen carbonate and wherein said highly flammable liquid material is gasoline.

* * * * *